P. MUELLER.
ADJUSTABLE FLANGE.
APPLICATION FILED APR. 8, 1909.
992,974.
Patented May 23, 1911.
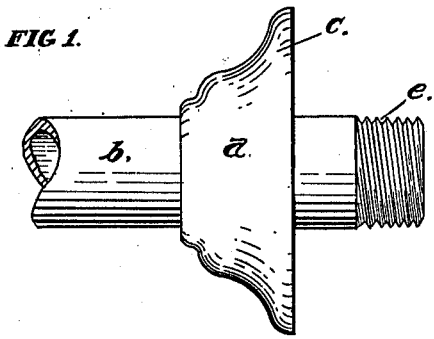
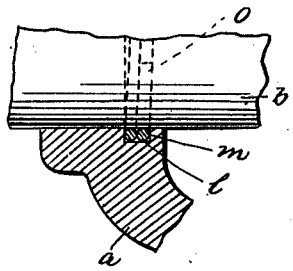
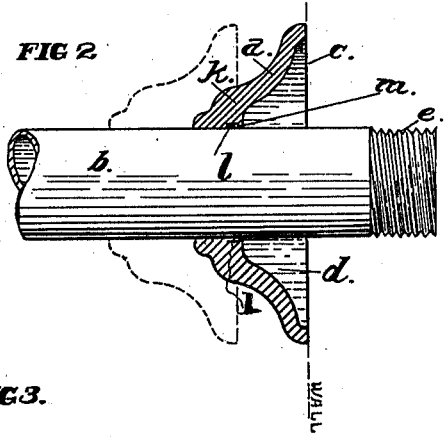
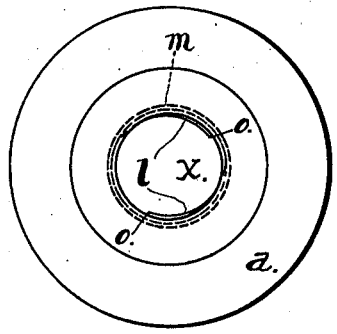
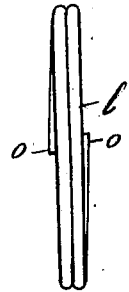
WITNESSES:
Kenneth Waddell
Henry Plate
INVENTOR
Philip Mueller
BY John L. Waddell
ATTORNEY

UNITED STATES PATENT OFFICE.

PHILIP MUELLER, OF DECATUR, ILLINOIS, ASSIGNOR TO THE H. MUELLER MANUFACTURING COMPANY, OF DECATUR, ILLINOIS, A CORPORATION OF ILLINOIS.

ADJUSTABLE FLANGE.

992,974.  Specification of Letters Patent.  Patented May 23, 1911.

Application filed April 8, 1909. Serial No. 488,649.

*To all whom it may concern:*

Be it known that I, PHILIP MUELLER, a citizen of the United States, and a resident of Decatur, in the county of Macon and State of Illinois, have invented a certain new and useful Improvement in Adjustable Flanges; and my preferred manner of carrying out the invention is set forth in the following full, clear, and exact description, terminating with claims particularly specifying the novelty of the same.

My invention relates to improvements in adjustable flanges and has particular relation to that type of these devices most commonly used for the finishing of a connection passing through a wall or floor aperture, and applicable to bibs, bath or basin cocks, or other suitable connections.

The principal object of the invention is to provide a flange for this purpose which has its exterior free from projections or openings, which may be readily adjusted lengthwise of the pipe, and which will retain its adjusted position without the necessity of manipulation by the workman.

A further object is to provide a flange of this type with an annular groove positioned intermediate the ends of the pipe opening which is formed therein, said groove being adapted to receive a spring member having its ends adapted to provide a frictional engagement with the pipe, the spring having a normal diameter greater than the diameter of the groove in order that the outer periphery of the spring will have a constant engagement with the bottom of the groove and thereby place a maximum tension on the ends of the spring to provide the necessary frictional engagement with the pipe.

Other objects are to provide a structure which is sanitary, which will protect the gripping member, which is neat and attractive in appearance, and which can be manufactured at a relatively low cost.

To these and other ends, the nature of which will be readily understood as the invention is hereinafter disclosed, said invention consists in the improved construction and combination of parts hereinafter fully described, illustrated in the accompanying drawings, and particularly pointed out in the appended claims.

In the accompanying drawings, in which similar reference characters indicate similar parts in each of the views, Figure 1 is a view in elevation of my improved flange positioned on a pipe. Fig. 2 is a sectional view of the flange positioned on a pipe, the view showing the flange in an adjusted position in dotted lines. Fig. 3 is an end view of the flange, the spring being partially shown in dotted lines. Fig. 4 is an elevation of the spring. Fig. 5 is a detail sectional view of parts shown in Fig. 2 on an enlarged scale.

Referring to the drawings, $a$ designates the flange body which, in the instance shown in the drawings, is fitted upon a pipe section $b$. The flange has its exterior imperforate with the exception of the opening or aperture $x$ through which the pipe $b$ is passed. The flange is provided with a wall face $c$ which is adapted to be passed into contact with the face of the wall through which the pipe $b$ is passed. The body $a$ is also provided with an annular groove $m$ open to the aperture $x$, the bottom of the groove being substantially concentric with the plane of the periphery of the aperture, said groove being positioned intermediate the ends of the aperture. The groove is adapted to receive a spring member $l$ formed of one or more convolutions of coiled material (the coil or coils of the member having approximate axial co-incidence with the axis of the groove), the diameter of the spring member being slightly greater than the diameter of the bottom of the groove $m$, thereby requiring a compression of the spring to permit its introduction into the groove, and retaining the spring member under a slight compression while within the groove, thereby placing a frictional engagement of the outer periphery of the spring member and the bottom of the groove which serves to tend to prevent a free annular movement of the flange on the pipe, and at the same time tends to cause the free ends of the spring member to extend inwardly, as indicated in Fig. 3, to reduce the normal diameter of the interior of the spring member, the ends $o$ being bent inwardly to a slight degree for this purpose.

As will be readily understood the spring member is almost entirely located within the annular groove $m$, the only projecting portions being the ends $o$, and as the groove is located intermediate the ends of the aperture $x$, the spring member will be retained against movement axially of the flange, while the walls of the groove will tend to protect the spring member from the effect of the conditions of use.

Inasmuch as the spring member is in the form of a coil having its axis corresponding substantially to the axis of the pipe member, the spring member will have its ends in successive transverse planes of its axis and consequently provide a frictional contact engagement with the pipe member at successive points in the length of said member.

In use, the flange is slipped over the pipe b to a position away from that in which it is intended to be normally used, after which the pipe is properly connected up, as by the use of the threaded end e, after which the flange is simply moved longitudinally of the pipe into contact with the face of the wall in which the pipe aperture is located. The ends o of the spring are sufficiently yieldable radially to permit of this longitudinal movement of the flange, but said ends are sufficiently resilient to provide for a firm frictional engagement of the ends and the pipe to retain the flange against longitudinal movement. As heretofore pointed out, the frictional engagement of the outer periphery of the spring with the bottom of the groove tends to prevent rotative movement of the flange on the pipe section or connection.

The advantages of this construction are believed to be clear from the above, and it is necessary only to add that by the construction shown the exposed exterior of the flange is entirely imperforate, requires the use of no adjusting means, such as a set screw, for the purpose of fixing the position of the flange relative to the pipe connection, requires no securing in position of the spring member within the groove, the latter retaining its approximate normal and initial shape and configuration at all times, and is removable from the groove and is settable therein with ease and rapidity.

Having thus described my invention, what I claim as new, is—

1. As an article of manufacture, a flange having an aperture therethrough adapted to receive a pipe member, said flange also having a shallow annular groove positioned intermediate the ends of the aperture, the plane of the bottom of the groove being substantially concentric with the plane of the aperture wall and of substantially equal depth throughout its width, and a yieldable member positioned in the groove for engaging the pipe member to retain the flange and pipe member in fixed relationship, said yieldable member having its axis in substantial coincidence with the axis of the aperture and having its flange-retaining engagement with the pipe in successive transverse planes of the pipe member, the depth of the groove being substantially equal to the thickness of the yieldable member in radial cross section.

2. As an article of manufacture, a flange having an aperture therethrough adapted to receive a pipe member, said flange also having a shallow annular groove positioned intermediate the ends of the aperture, the plane of the bottom of the groove being substantially concentric with the plane of the aperture wall and of substantially equal depth throughout its width, and a coil spring positioned within the groove, the axis of the coil or coils of the spring being in substantial coincidence with the axis of the groove and having its ends projecting inwardly beyond the plane of the aperture wall and adapted to frictionally engage a pipe member and retain the flange and member in fixed relationship, the ends of the spring having engagement with the pipe member in successive transverse planes in the direction of length of the pipe member.

3. As an article of manufacture, a flange having an aperture therethrough adapted to receive a pipe member, said flange also having a shallow annular groove, the plane of the bottom wall of the groove being substantially concentric with the plane of the aperture wall, and a coil spring positioned within the groove and having the axis of its coil or coils in substantial coincidence with the axis of the groove, said spring having a normal diameter greater than the diameter of the bottom wall of the groove to retain the spring under constant compressive tension, the ends of the spring extending inwardly beyond the inner peripheral plane of the compressed spring, and being adapted to frictionally engage the pipe member at points in successive transverse planes of the pipe member to establish the flange in fixed relation to said member.

In testimony whereof, I have hereunto subscribed my signature, this the 30th day of March, A. D. 1908.

PHILIP MUELLER.

Witnesses:
GOLDIE M. PERRY,
JOHN L. WADDELL.

---

Copies of this patent may be obtained for five cents each, by addressing the "Commissioner of Patents, Washington, D. C."